(12) United States Patent
Wang et al.

(10) Patent No.: US 10,021,398 B2
(45) Date of Patent: *Jul. 10, 2018

(54) ADAPTIVE TILE DATA SIZE CODING FOR VIDEO AND IMAGE COMPRESSION

(71) Applicant: GOOGLE LLC, Mountain View, CA (US)

(72) Inventors: Yunqing Wang, Palo Alto, CA (US); Jingning Han, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,592

(22) Filed: Sep. 15, 2017

(65) Prior Publication Data
US 2018/0007366 A1 Jan. 4, 2018

Related U.S. Application Data

(63) Continuation of application No. 14/992,407, filed on Jan. 11, 2016, now Pat. No. 9,794,574.

(51) Int. Cl.
*G06K 9/36* (2006.01)
*H04N 19/14* (2014.01)
(Continued)

(52) U.S. Cl.
CPC .......... *H04N 19/14* (2014.11); *H04N 19/115* (2014.11); *H04N 19/124* (2014.11); *H04N 19/137* (2014.11); *H04N 19/159* (2014.11); *H04N 19/184* (2014.11); *H04N 19/44* (2014.11); *H04N 19/60* (2014.11); *H04N 19/91* (2014.11)

(58) Field of Classification Search
CPC ...... H04N 19/70; H04N 19/174; H04N 19/46; H04N 19/115; H04N 19/14
See application file for complete search history.

(56) References Cited

U.S. PATENT DOCUMENTS

| 2004/0181715 A1* | 9/2004 | Lamy | H04L 1/0083 |
| | | | 714/710 |
| 2007/0051817 A1* | 3/2007 | Yano | H04N 1/64 |
| | | | 235/494 |

(Continued)

OTHER PUBLICATIONS

Misra, Kiran, Andrew Segall, Michael Horowitz, Shilin Xu, Arild Fuldseth, and Minhua Zhou. "An overview of tiles in HEVC." IEEE Journal of selected topics in signal processing 7, No. 6 (2013): 969-977.*

*Primary Examiner* — Li Liu
(74) *Attorney, Agent, or Firm* — Young Basile Hanlon & MacFarlane, P.C.

(57) ABSTRACT

A method for encoding a video signal includes estimating a space requirement for encoding a tile of a video frame, writing a first value in a first value space of the bitstream, wherein the first value describes a size of a second value space, and defining the second value space in the bitstream, wherein the size of the second value space is based on an estimated space requirement. The method also includes writing encoded content in a content space of the bitstream, determining a size of the content space subsequent to writing encoded content in the content space, and writing a second value in the second value space of the bitstream, wherein the second value describes the size of the content space.

20 Claims, 9 Drawing Sheets

(51) Int. Cl.
*H04N 19/91* (2014.01)
*H04N 19/44* (2014.01)
*H04N 19/115* (2014.01)
*H04N 19/184* (2014.01)
*H04N 19/124* (2014.01)
*H04N 19/137* (2014.01)
*H04N 19/159* (2014.01)
*H04N 19/60* (2014.01)

(56) References Cited

U.S. PATENT DOCUMENTS

| | | | | |
|---|---|---|---|---|
| 2009/0003714 | A1* | 1/2009 | Subramaniam | H04N 19/176 |
| | | | | 382/232 |
| 2015/0181218 | A1* | 6/2015 | Okawa | H04N 19/513 |
| | | | | 375/240.16 |
| 2015/0201202 | A1* | 7/2015 | Hattori | H04N 19/70 |
| | | | | 375/240.02 |
| 2015/0304673 | A1* | 10/2015 | Araki | H04N 19/44 |
| | | | | 382/233 |

\* cited by examiner

ADAPTIVE TILE DATA SIZE CODING FOR VIDEO AND IMAGE COMPRESSION

CROSS-REFERENCE TO RELATED APPLICATION(S)

This disclosure is a continuation of U.S. patent application Ser. No. 14/992,407, filed Jan. 11, 2016, the disclosure of which is incorporated by reference herein in its entirety.

TECHNICAL FIELD

This disclosure relates to encoding and decoding visual data, such as video stream data, for transmission or storage and subsequent display.

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques.

In some video compression methods, a video frame can be divided into portions referred to as tiles. A tile may be square or rectangular, and includes multiple blocks of pixels. By dividing a frame into tiles, the tiles can be encoded and/or decoded in parallel. Tiles also allow decoding of only part of the image, by decoding only certain tiles while not decoding other tiles. In current video encoder and decoder implementations, the number of tiles per frame is small, such as 4 to 8 tiles.

In video compression methods that implement tile coding, the portion of the video bitstream that corresponds to a particular tile includes a tile data header and the tile content data. The tile data header stores a tile data size (TDS) value that makes the decoder aware of where the tile content data for the tile starts and stops. For example, the TDS value can describe the number of bits used to encode the tile content data. The tile content data are the encoded data that corresponds to image within the tile. Thus, the TDS value allows the decoder to locate the tile content data and decode the tile content data in order to reconstruct the tile.

SUMMARY

One aspect of the disclosed embodiments is a method for encoding a video signal comprising video frames into a bitstream. The method includes identifying encoded content associated with at least a portion of the video signal. The method further includes writing, to a first space of the bitstream, a first value indicating a number of bits for encoding a length of the encoded content to the bitstream. The method further includes writing, to a second space of the bitstream, a second value indicating the length of the encoded content.

Another aspect of the disclosed embodiments is an apparatus for encoding a video signal comprising video frames into a bitstream. The apparatus includes a memory and a processor configured to execute instructions stored in the memory. The instructions cause the processor to identify encoded content associated with at least a portion of the video signal. The instructions further cause the processor to write, to a first space of the bitstream, a first value indicating a number of bits for encoding a length of the encoded content to the bitstream. The instructions further cause the processor to write, to a second space of the bitstream, a second value indicating the length of the encoded content.

Another aspect of the disclosed embodiments is a method including decoding encoded content from a bitstream including a first value and a second value. The first value indicates a number of bits used for encoding a length of the encoded content to the bitstream. The second value indicates the length of the encoded content.

BRIEF DESCRIPTION OF THE DRAWINGS

The description herein makes reference to the accompanying drawings wherein like reference numerals refer to like parts throughout the several views.

DETAILED DESCRIPTION

Figure 1:
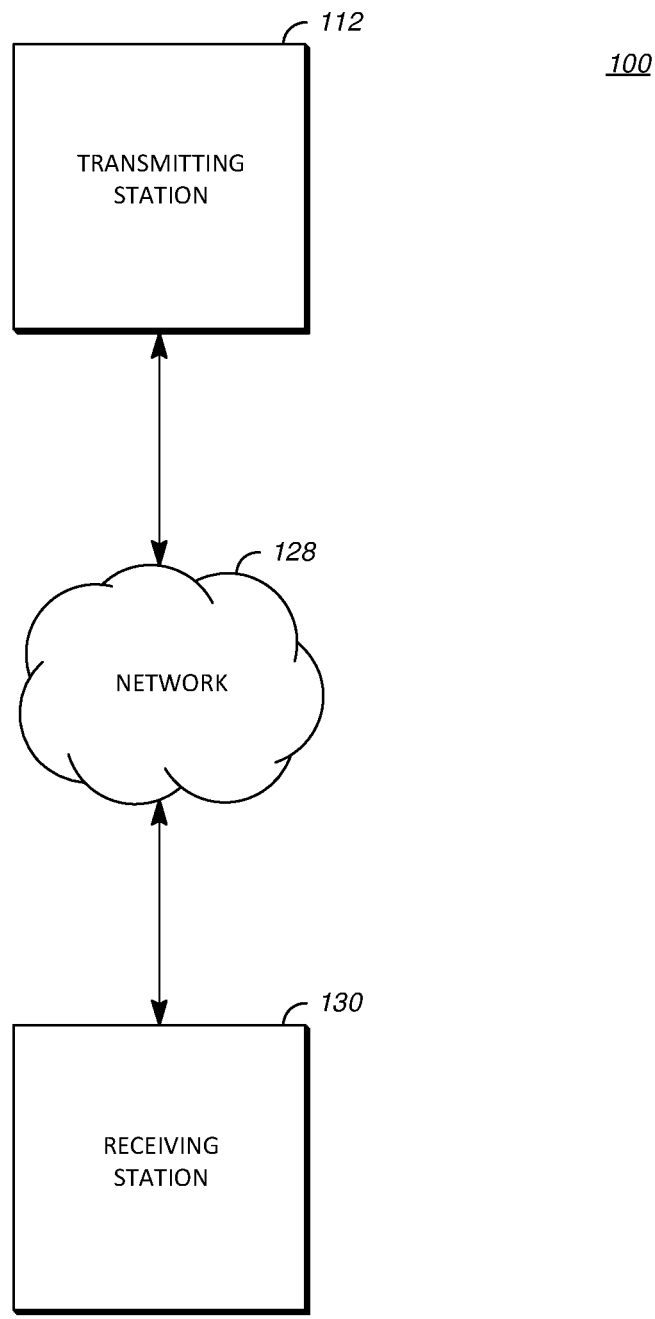
FIG. 1 is a schematic of a video encoding and decoding system.

Tile coding introduces an additional bit cost for each tile, equal to the number of bits spent encoding the tile data header. Although this bit cost is insignificant in current implementations that use a small number of tiles, the additional bit cost can be significant if the number of tiles is increased. Future tile coding applications increase the usage of tile coding and result in a large increase in the number of tiles coded per frame. For example, virtual reality applications may benefit greatly from being able to decode only a portion of a frame, and frame in virtual reality applications may include more than one million tiles (e.g. a grid of 1024 tiles by 1024 tiles).

In current implementations, a fixed number of bits is set aside for coding the TDS value in the tile data header. A fixed number of bits is used because the tile data header appears in the bitstream before the tile content data. Because the tile content data has not been encoded at the time that space is allocated in the bitstream for the tile data header, the size of the tile content data is not known. After the tile content data are encoded and written to the bitstream, its size is then known, and can be written into the space that was previously reserved for the TDS value in the tile data header.

Because the number of bits reserved for coding the TDS value in the tile data header is fixed, the length selected for the tile data header is based on a largest expected length for the TDS value, such as when the tile size is large and the content data are poorly compressed, resulting in a large size for the tile content data. If the tile content data are small in size, the result may be that the number of bits reserved for storing the TDS value in the tile data header is much larger than the number of bits actually required to store the TDS value.

In order to lower the overhead cost associated with tile coding and achieve a better compression performance, the methods and systems herein efficiently store the TDS value for each tile. This may be done by adaptively allocating the number of bits reserved for storing the TDS value for each tile by estimating a space requirement for encoding the tile. The size of the space reserved in the tile data header for the TDS value is written as a first value, which may be referred to herein as a first size value or a TDS_Bits value. The first size value describes the size of the space reserved in the tile data header for the TDS value. After the encoded tile content data are written to the bitstream, the TDS value, which describes the size of the encoded tile content data, is written to the bitstream space that was previously reserved in the tile data header for the TDS value. The TDS value may also be referred to herein as a header value or a second size value. Thus, the methods and systems described herein may include, for example, writing a first size value in a first value space of a bitstream describing an estimated space requirement, reserving a header space of the bitstream having a size corresponding to size value, writing encoded content to the bitstream, and writing a second size value describing a size of the encoded content in the header space.

FIG. 1 is a schematic of a video encoding and decoding system 100 in which the systems and methods described herein can be implemented. An exemplary transmitting station 112 can be, for example, a computer having an internal configuration of hardware such as that described in FIG. 2. However, other suitable implementations of the transmitting station 112 are possible. For example, the processing of transmitting station 112 can be distributed among multiple devices.

A network 128 can connect the transmitting station 112 and a receiving station 130 for encoding and decoding of a video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
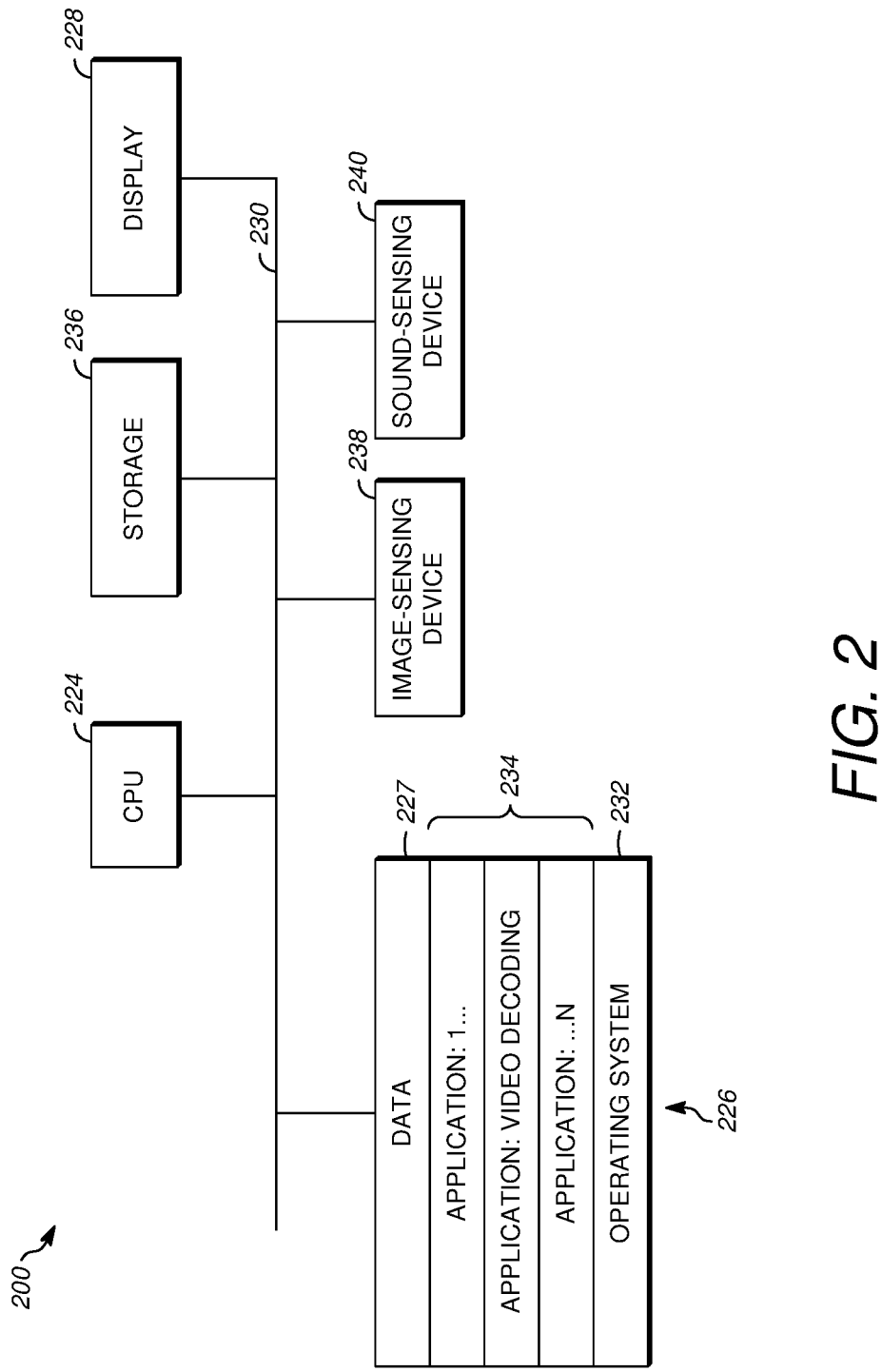
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, the receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., a Hypertext-Transfer Protocol (HTTP)-based video streaming protocol.

As will be explained further herein, the transmitting station 112 and the receiving station 130 are examples of devices that can be included in the video encoding and decoding system 100. Additional devices can be included, such as a server that relays transmissions from the transmitting station 112 to the receiving station 130.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as the memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. As shown, for example, application programs 234 can include applications 1 through N, which further include an application that performs a method described here. Computing device 200 can also include a secondary storage 236 that can be, for example, a memory card used with a mobile computing device. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) or light emitting diode (LED) display, such as an organic LED (OLED) display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
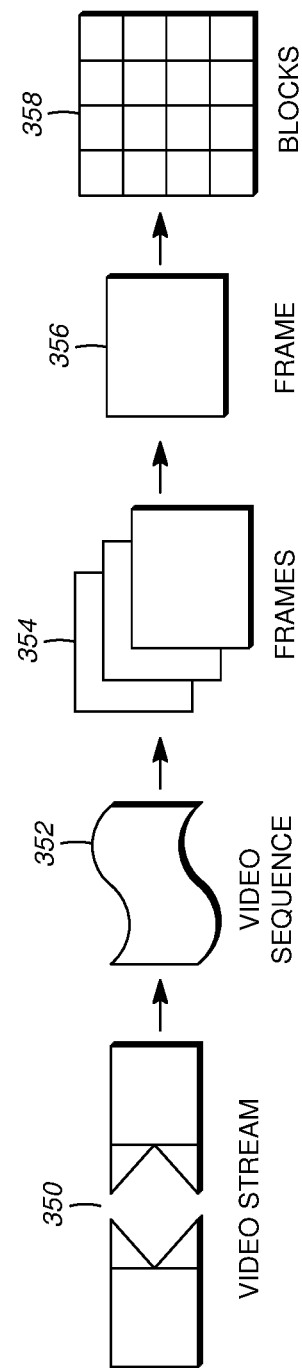
FIG. 3 is a diagram of a typical video stream to be encoded and subsequently decoded.

FIG. 3 is a diagram of an example of a video 350 to be encoded and subsequently decoded. Video 350 includes a video sequence 352. At the next level, video sequence 352 includes a number of adjacent frames 354. While three frames are depicted as adjacent frames 354, video sequence 352 can include any number of adjacent frames 354. Adjacent frames 354 can then be further subdivided into individual frames, e.g., a frame 356. At the next level, frame 356 can be divided into a series of blocks 358, which can contain data corresponding to, for example, 16×16 pixels in frame 356. The blocks can also be arranged in planes of data. For example, a corresponding block in each plane can respectively contain luminance and chrominance data for the pixels of the block. Blocks 58 can also be of any other suitable size such as 16×8 pixel groups or 8×16 pixel groups and can be further subdivided into smaller blocks depending on the application. Unless otherwise noted, the terms block and macroblock are used interchangeably herein.

Figure 4:
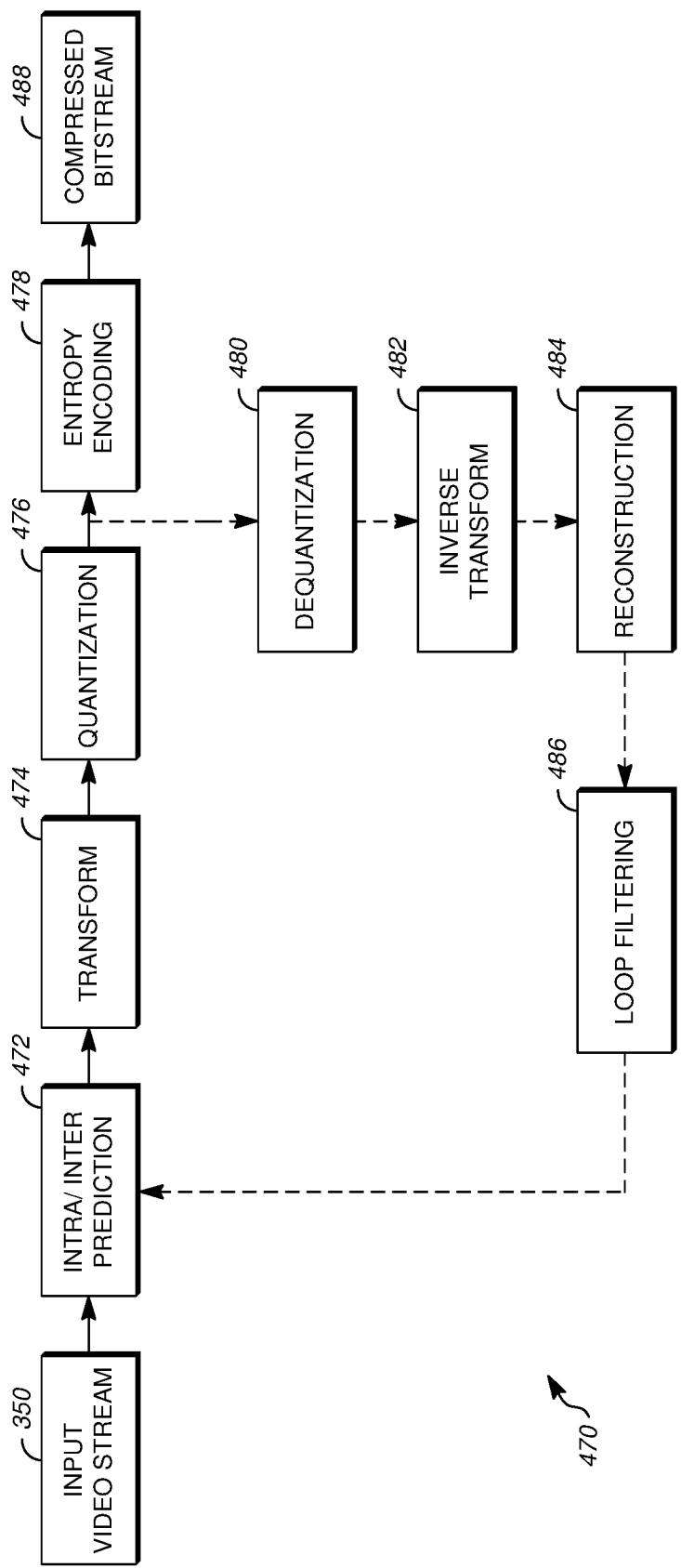
FIG. 4 is a block diagram of a video compression system in accordance with an aspect of this disclosure.

FIG. 4 is a block diagram of an encoder 470 in accordance with an aspect of this disclosure. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included, for example, in transmitting station 112. Encoder 470 has the following stages to perform the various functions in a forward path (shown by the solid connection lines) to produce an encoded or compressed bitstream 488 using video 350 as input: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 4, encoder 470 has the following stages to perform the various functions in a reconstruction path: a dequantization stage 480, an inverse transform stage 482, a reconstruction stage 484, and a loop filtering stage 486. Other structural variations of encoder 470 can be used to encode video 350.

When video 350 is presented for encoding, the frame 356 within the video 350 can be processed in units of blocks 358. At the intra/inter prediction stage 472, a block can be encoded using intra-frame prediction (prediction using blocks within a single frame) or inter-frame prediction (prediction using blocks from a different frame). In any case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loéve Transform (KLT), the Discrete Cosine Transform (DCT), and the Singular Value Decomposition Transform (SVD). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to compressed bitstream 488. Compressed bitstream 488 can be formatted using various techniques, such as variable length coding (VLC) or arithmetic coding. Compressed bitstream 488 can also be referred to as an encoded video stream and the terms are used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at the intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474. In another implementation, an encoder 470 can have quantization stage 476 and dequantization stage 480 combined into a single stage.

Figure 5:
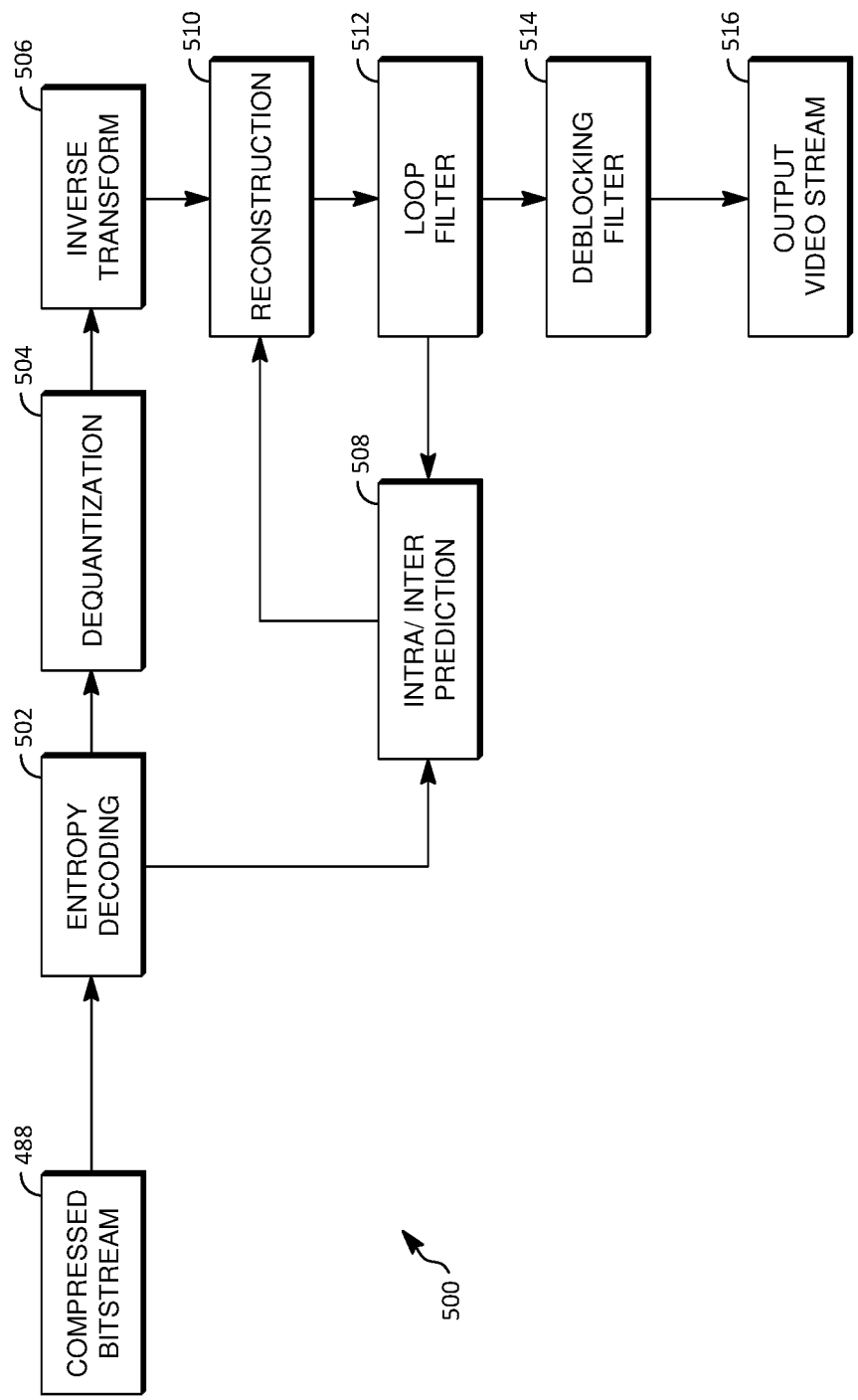
FIG. 5 is a block diagram of a video decompression system in accordance with another aspect of this disclosure.

FIG. 5 is a block diagram of a decoder 500 in accordance with an implementation. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included, for example, in transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a filtering stage 512, which can include loop filtering and/or deblocking and a frame buffering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488 such as modes and motion vectors, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Filtering stage 512 can be applied to the reconstructed block to reduce blocking artifacts. Information can then be held in a frame buffer at frame buffering stage 514 for subsequent use in decoding or output. A post-processing stage can be applied to the reconstructed block to further refine the image. The result of the process performed by the decoder 500 is output as output video stream 516. Output video stream 516 can also be referred to as a decoded video stream and the terms are used interchangeably herein.

Other variations of decoder 500 can be used to decode compressed bitstream 488. For example, decoder 500 can produce output video stream 516 without post-processing.

Figure 6:
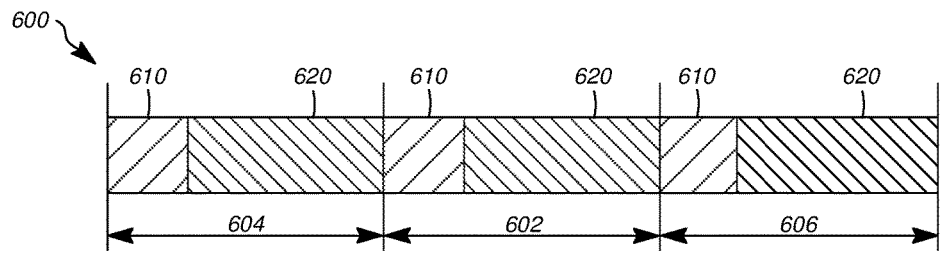
FIG. 6 is an illustration showing a bitstream with fixed-length tile data space coding.

FIG. 6 shows a portion of a bitstream 600 with fixed-length tile data space coding. A compressed image or video frame is composed of a series of tiles, and thus the bitstream 600 includes a plurality of tiles such as a current tile 602, a previous tile 604, and a subsequent tile 606. Each of the current tile 602, the previous tile 604, and the subsequent tile 606 includes a tile data header 610 and content space 620.

In order to decode a tile such as the current tile 602, the previous tile 604, or the subsequent tile 606, the content space 620 for the tile is first located in the bitstream 600. Because of this, the tile data header 610 is located prior to the content space 620 in the bitstream. The tile data header 610 is or includes a fixed length header space of the bitstream 600 that is reserved before encoded tile content data are written to the bitstream in a content space 620 of the bitstream 600. The tile data header 610 is fixed length because the actual size of the content space 620 can only be known after the tile content data are actually encoded and written to the content space 620. The tile data header 610 is allocated and reserved in the bitstream 600 prior to writing the encoded tile content data to the bitstream. As an example, four bytes may be reserved in the bitstream for the tile data header. After the encoded tile content data are written in the content space 620, the size of the content space 620 (e.g. the length of the content space 620 in bits) is used as the TDS value, which is stored in the tile data header 610.

Figure 7A:
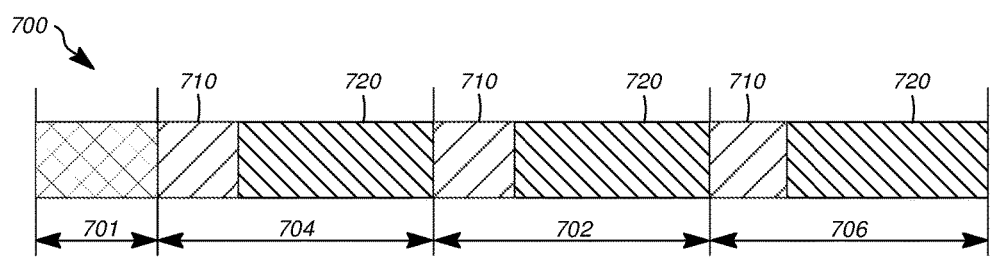
FIG. 7A is an illustration showing a bitstream with adaptive tile data space coding according to a first example.

FIG. 7A shows a portion of a bitstream 700 with adaptive tile data space coding according to a first example. A compressed image or video frame is composed of a series of tiles. Thus, the bitstream 700 includes a first data space in the form of a frame-level (or image-level) data space such as a frame header 701 and a plurality of tiles such as a current tile 702, a previous tile 704, and a subsequent tile 706. The frame header 701 may include data that apply to some or all of the tiles. Each of the current tile 702, the previous tile 704, and the subsequent tile 706 includes a tile data header 710 that includes data relevant only to the respective tile and a content space 720 that includes the image information for the tile.

In order to decode a tile such as the current tile 702, the previous tile 704, or the subsequent tile 706, the content space 720 for the tile is first located in the bitstream 700. Because of this, the frame header 701 and the tile data header 710 are positioned prior to the content space 720 in the bitstream.

A first value which may be referred to as a first size value or a TDS_Bits value is coded un-compressedly, or compressedly by using entropy coding, and written in the first value space of the bitstream. In this example, the first value space is within the frame-level data space, namely, in the frame header 701, which is arranged in the bitstream prior to the tile data. In the special case that a fixed first value is used for every tile in an image or a video frame, the first value can be written in the first value space of the bitstream only once for the whole image or frame. A second value which may be referred to as a second size value or a TDS value is written in a second value space. In this example, the second value space is all or part of the tile data header 710.

The first value describes the number of bits used by the second value space. For example, if the first value is equal to sixteen (or represents the value 16 such as by being a symbol that represents sixteen), this signifies that the second value space is sixteen bits in length. In this implementation, the first value is stored at the frame-level, and applies to all frames, which means that the number of bits used for the second value space of each tile at the tile-level is the same.

The second value that is stored in the second value space such as in tile data header 710 describes the number of bits used by the content space 720 for the respective tile. For example, if the second value that is stored in the tile data header 710 is equal to 65,535 (or represents the value 65,535 such as by being a symbol that can be interpreted to mean 65,355), which can be expressed in a bit length of sixteen bits, this signifies that the content space 720 is 65535 bits in length. As will be explained herein, the exact required length of the tile data header 710 may not be known at the time the tile data header 710 is allocated. Instead, bits are reserved in the bitstream 700 based on an estimated space requirement for encoding the tile, and the second value is written to the tile data header 710 after the encoded tile content data are written to the content space 720.

The first value and the second value are used to allow the content space 720 to be located when decoding the bitstream. When decoding a tile such as the current tile 702, the first value is read from the bitstream before decoding the current tile 702. The first value informs the decoder of the length of the tile data header 710, which allows the decoder to read the second value from the tile data header 710. The second value informs the decoder of the length of the content space 720, which allows the decoder to read the encoded content from the content space 720.

Figure 7B:
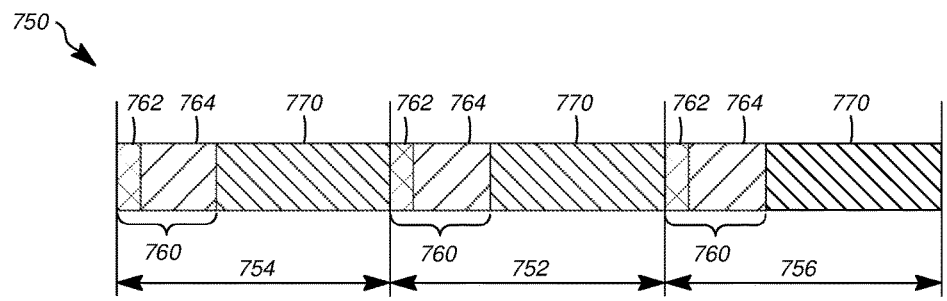
FIG. 7B is an illustration showing a bitstream with adaptive tile data space coding according to a second example.

FIG. 7B shows a portion of a bitstream 750 with adaptive tile data space coding according to a second example. The bitstream 700 a plurality of tiles such as a current tile 752, a previous tile 754, and a subsequent tile 756. Each of the current tile 752, the previous tile 754, and the subsequent tile 756 includes a tile data header 760 that includes data relevant only to the respective tile and a content space 770 that includes the image information for the tile.

In order to decode a tile such as the current tile 752, the previous tile 754, or the subsequent tile 756, the content space 770 for the tile is first located in the bitstream 750. Because of this, the tile data header 760 are positioned prior to the content space 770 in the bitstream.

In this example, both the first value space and the second value space are located in the tile data header 760, and the first value, i.e. the first size value or the TDS_Bits value, is stored separately for each tile and can be determined on a tile by tile basis. The first value for each tile is coded uncompressedly, or compressedly by using entropy coding, and written in the first value space of the bitstream, such as in a first header space 762 of the current tile 752. In this example, the first value space is located within the tile-level data space. The second value, i.e. the second size value or the TDS value is written in the second value space, which in this example is a second header space 764 of the tile data header 760.

Figure 8:
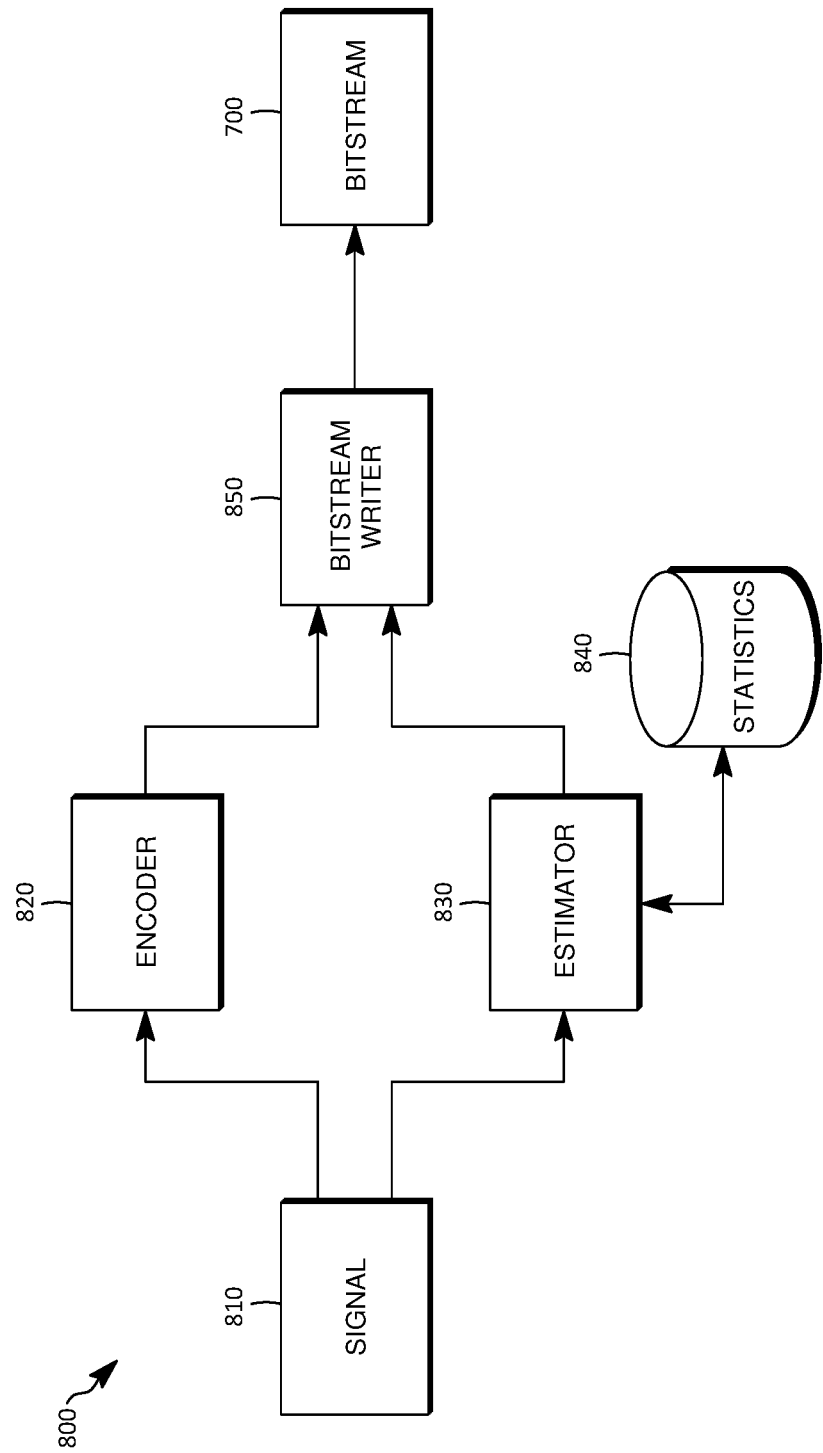
FIG. 8 is a block diagram showing a system for adaptive tile data space coding.

FIG. 8 is a block diagram showing a system 800 for adaptive tile data space coding. In the system 800, an input signal 810 is received and provided as an input to an encoder 820 and an estimator 830. The input signal 810 can be, as examples, a video signal or a still image signal. The description herein will be made with reference to an input signal in the form of a video signal except as noted.

The encoder 820 is operable to compress portions of the input signal 810 and output a compressed version of the content from the input signal 810 that can be written to a bitstream, such as the bitstream 700. The encoder 820 can be implemented in the manner described with respect to the encoder 470.

The estimator 830 is operable to estimate a space requirement for encoding a portion of the input signal 810. The estimator 830 may use previously stored information such as encoding statistics 840 to estimate the space requirement for encoding the portion of the input signal. The encoding statistics 840 can be, for example, statistical data describing prior content from a video signal such as the input signal. Information may be provided to the estimator 830 by the encoder 820 to be added to and stored as the encoding statistics 840.

In implementations where the portion of the input signal 810 to be encoded is a tile of a video signal, the estimated space requirement can be based in part on a tile size of the current portion of the input signal 810 (e.g. the tile sizes in the current frame or the tile size of the next tile to be encoded). The estimated space requirement increases as the tile size increases.

The estimated space requirement can be estimated based in part on a complexity of the current portion of the input signal 810. Complexity can be used as a basis for the estimated space requirement because low complexity images tend to compress to a much greater degree than high complexity images. Complexity can be analyzed for a portion of an image (e.g. a portion of a video frame), a single image (e.g. a video frame), or multiple images (e.g. a series of video frames. A single measure of video complexity or two or more measures of video complexity can be combined. Measures of video complexity may be expressed, for example, a numerical score, and combined (if needed) as an average or weighted average. In some implementations, measures of video complexity, such as numerical scores, are used as a basis for classifying the video into a category (e.g. low, medium, or high complexity) by thresholding or similar measures. Thus, the complexity for a portion of the input signal 810 such as a video frame can be expressed as a selected complexity classification from a plurality of predetermined complexity classifications.

Numerous known measures of complexity can be utilized. As one example, the amount of motion in a series of video frames can be measured, in terms of one or both of the portion of areas of the video frames in which motion is present and the speed of the motion (e.g. the length of motion vectors). Thus, the complexity for the input signal 810 such as a video frame may determined based in part on an amount of motion in a previous sequence of video frames from the input signal, or as an amount of motion in the video frame relative to previous video frames in the sequence. As another example, the amount of detail in an image or series of images can be measured, with lower detail images corresponding to less complexity and higher detail images corresponding to more complexity.

The data used for determining complexity (e.g. motion and/or detail) may be obtained from the encoding statistics 840. The encoding statistics 840 which may have been stored subsequent to encoding prior content from the input signal 810. Thus, the encoding statistics 840 may include statistical data describing prior content from the input signal 810 that was stored prior to estimating a space requirement for encoding the tile of the video frame.

The encoding statistics 840 can include, for example, data describing the number of bits required to encode portions of the input signal 810 for multiple levels of complexity. In one implementation, data stored in the encoding statistics are independent of the size of the portion of the input signal to be encoded. The encoding statistics 840 in this example may include statistics that may be scaled based on the size of the portion of the input signal to be encoded in order to determine the number of bits required to encode the input signal. For instance, the encoding statistics 840 may express the number of bits required to express a portion of an input signal 810 of medium complexity on a per-pixel basis. Thus, if the portion of the input signal 810 is a tile from a video frame, the estimator would determine the complexity of the tile, determine the size of the tile in pixels, and determine the number of bits required to encode the tile based on encoding statistics 840 describing the encoding of previous tiles of the same complexity scaled by the size of the tile in pixels. In an alternative implementation, the encoding statistics 840 express the number of bits required to encode a portion of the input signal 810 of a specific size (such as a tile size) for a given level of complexity.

In one implementation, when the encoder 820 encodes a portion of the input signal 810 such as a tile, it reports the number of bits used in encoding to the estimator 830, and this value is stored in the encoding statistics for use in estimating the number of bits required to encode further similar-sized portions of the input signal 810.

The output of the estimator 830 is the estimated space requirement, which is an estimate of the number of bits that will be required to encode the portion of the input signal 810 that is currently being encoded.

The system 800 includes a bitstream writer 850. The bitstream writer 850 receives a compressed version of the content from the input signal 810 from the bitstream writer 850. The bitstream writer 850 receives the estimated space requirement from the estimator 830. The bitstream writer 850 uses the compressed version of the content and the estimated space requirement to write the bitstream 700. The bitstream writer 850 may also report information back to the estimator 830 to be stored as part of the encoding statistics 840.

Figure 9:
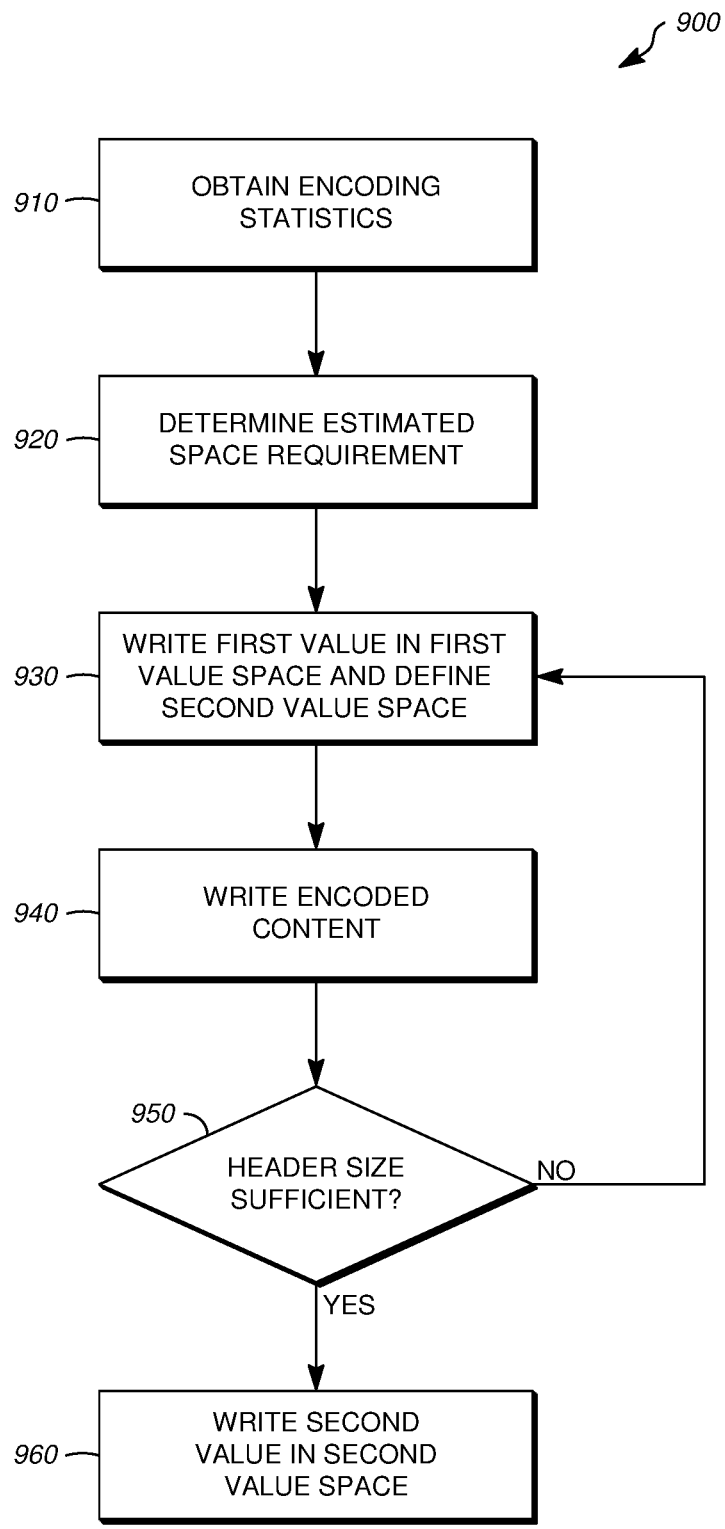
FIG. 9 is a flowchart showing an adaptive tile data space coding process according to a first example.

FIG. 9 is a flowchart showing a process 900 for adaptive tile data space coding according to a first example. The process 900 will be explained with reference to the bitstream 700 but can be applied to the bitstream 750. The process 900 may be implemented as described with respect to the system 800, such as in the form of a software program that is executed by computing devices such as the transmitting station 112 or the receiving station 130. The software program can include machine-readable instructions that are stored in a memory such as memory 226 that, when executed by a processor such as CPU 224, cause the computing device to perform the process 900. The process 900 can also be implemented using hardware. As explained above, some computing devices may have multiple memories and multiple processors, and the steps of the process 900 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

Operation 910 includes obtaining the encoding statistics 840 describing encoding of prior content from the input signal 810. Obtaining the encoding statistics 840 can be performed by, as examples, measuring the encoding statistics 840, accessing stored copies of the encoding statistics 840, or receiving a transmission that includes the encoding statistics 840. Obtaining encoding statistics can be performed as described with respect to the estimator 830 and the encoding statistics 840.

In operation 920, the encoding statistics are used to determine the estimated space requirement, as described with respect to the estimator 830.

In operation 930, the bitstream writer 850 writes the first value to the first value space and defines the second value space, such as the tile data header 710. The first value (TDS_Bits) describes the size of the header space, and the first value is based on the estimated space requirement. For example, the bitstream writer 850 uses the estimated space requirement to determine how many bits may be needed to write the length of the content space 720 in the second value space. This can be done by multiplying the estimated space requirement by a factor k (e.g. 1.3) to account for variability, and counting the number of bits required to express this value as binary number. The resulting value is the number of bits that will be reserved for the header space, and this value is stored in the first value space of the bitstream as the first value (TDS_Bits). The first value can be stored as an actual value or a representative value, such as a delta value that can be combined with a reference value such as an average value for a frame or series of frames. After writing the first value to the bitstream in the first value space, the tiles can then be coded. At the start of each tile, the bitstream writer advances by a number of bits equal to the value of the first value (TDS_Bits) in order to reserve the second value space such as the tile data header 710 in the bitstream 700 for writing the length of the content space 720 as the second value (the TDS value) at a later time.

In operation 940, the bitstream writer 850 receives the encoded content from the encoder 820 and writes the encoded content to the content space 720.

In operation 950, a determination is made as to whether the length of the second value space that was previously reserved for storing the second value is sufficient. In one implementation, the number of bits used to write the encoded content to the content space 720 (i.e. the length of the content space 720) is expressed in a form suitable for storage as the second value (e.g. a delta value expressed as a binary number). This value is compared to the number of bits that was reserved for the second value space. If the number of bits reserved for the second value space is insufficient to store the value describing length of the content space 720, the process returns to operation 930, with the actual length of the encoded content used instead of the estimated space requirement. Thus, if a space requirement for writing the second value is greater than the size of the second value space, the second value space is redefined to have a corrected size based on the space requirement, the first value is rewritten to describe the corrected size, and the encoded content is rewritten to the bitstream.

If, at operation 950, the number of bits reserved for the second value space is sufficient to store the second value describing length of the content space 720, the process proceeds to operation 960. In operation 960 the bitstream writer 850 changes position to return to the starting point of the second value space, and writes the second value describing the length of the content space 720 in the second value space to allow the content space 720 to be located and accessed in the bitstream 700. The second value can be stored as an actual value or a representative value, such as a delta value that can be combined with a reference value such as an average value for a frame or series of frames. In some implementations, the second value is uncompressed. In other implementations, the second value is compressed, such as by entropy encoding. The process then ends with respect to the current portion of the input signal 810 and may be repeated for other portions of the input signal 810.

Figure 10:
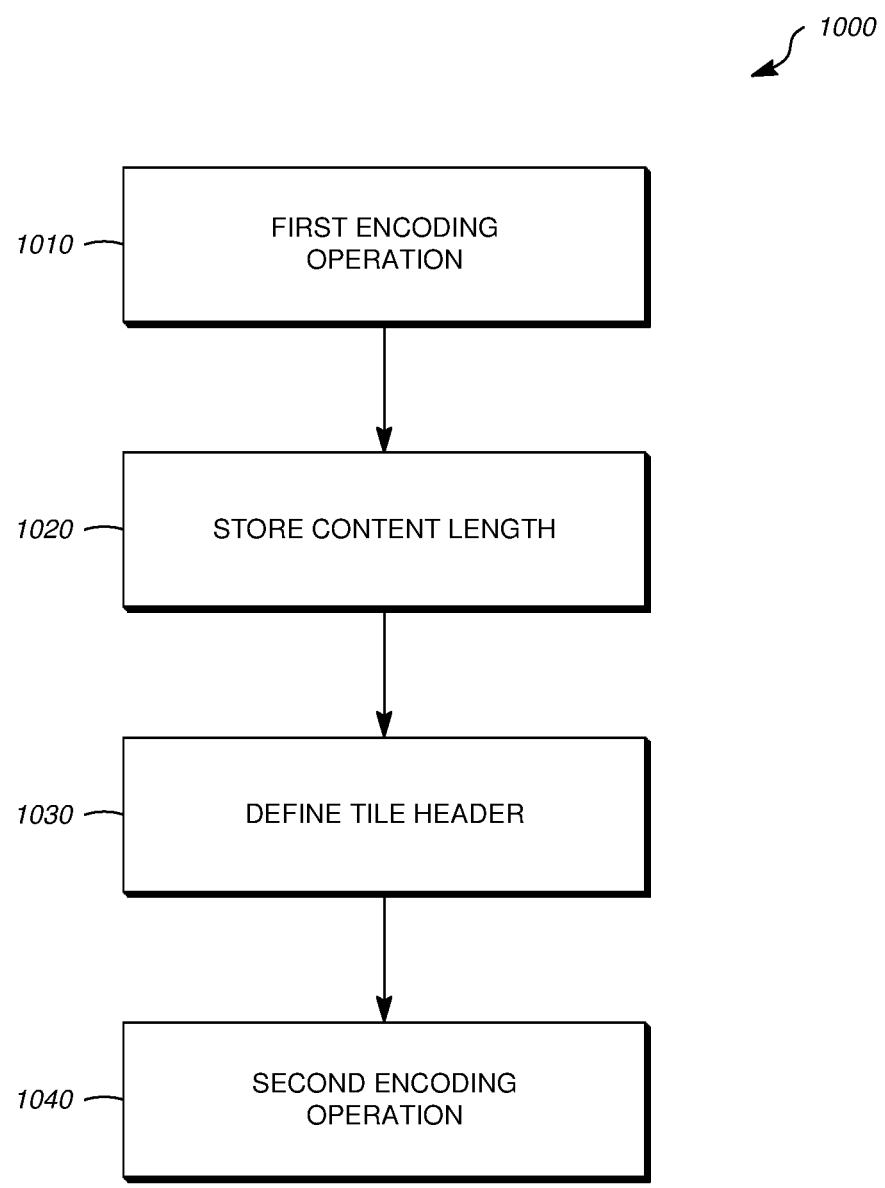
FIG. 10 is a flowchart showing an adaptive tile data space coding process according to a second example.

FIG. 10 is a flowchart showing a process 1000 for adaptive tile data space coding according to a second example. The process 900 will be explained with reference to the bitstream 700 but can be applied to the bitstream 750.

Whereas the process 900 is well-suited to real-time applications, the process 1000 may produce better results for non-real-time applications. Instead of using an estimated space requirement as in the process 900, the process 1000 performs two encoding operations to first determine the length of the encoded content, and subsequently write the tile header and the encoded content to the tile data header 710 and the content space 720.

The process 1000 may be implemented as described with respect to the system 800, such as in the form of a software program that is executed by computing devices such as the transmitting station 112 or the receiving station 130. The software program can include machine-readable instructions that are stored in a memory such as memory 226 that, when executed by a processor such as CPU 224, cause the computing device to perform the process 1000. The process 1000 can also be implemented using hardware. As explained above, some computing devices may have multiple memories and multiple processors, and the steps of the process 1000 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

In operation 1010 a first encoding operation is performed as described with respect to the encoder 820 to define encoded content from a portion of the input signal 810. In operation 1020, the length of the encoded content is stored.

In operation 1030, the tile data header 710 is defined. This includes, for example, determining the number of bits required to encode the length of the encoded content and writing this value as a first value in the bitstream. The length of the encoded content is then written as the second value in the tile data header 710. In this implementation, the first value represents the actual length of the tile data header 710 that is required to store the second value and is not an estimate. Accordingly, there will be no unnecessary bits allocated to the tile data header 710, as may occur when an estimated value is used.

In operation 1040 a second encoding operation is performed as described with respect to the encoder 820, and the resulting encoded content is written to the bitstream 700 as described with respect to the bitstream writer 850.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized that contains other hardware for carrying out any of the methods, algorithms, or instructions described herein.

Transmitting station 112 and receiving station 130 can, for example, be implemented on computing devices of any type. For instance, the transmitting station 112 can be a personal computer that includes a video capture device for obtain raw video to be encoded and the receiving station 130 can be a personal computer that includes a video display device for displaying decoded video. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable implementation schemes for the transmitting station 112 and receiving station 130 are available. As one example, receiving station 130 can be a generally stationary personal computer rather than a portable communications device. As another example, a device that includes the encoder 470 may also include the decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal comprising video frames into a bitstream, the method comprising:
   writing, using a processor, a first value in a first space of the bitstream, the first value indicating a number of bits available within a second space of the bitstream, the first value determined based on an estimated space requirement for encoding a portion of the video signal;
   writing, using the processor, encoded content in a content space of the bitstream, the encoded content associated with the portion of the video signal; and
   writing, using the processor, a second value in the second space, the second value indicating a number of bits used to write the encoded content in the content space, the second value determined subsequent to writing the encoded content in the content space.

2. The method of claim 1, wherein writing the encoded content in the content space of the bitstream comprises:
performing a first encoding operation to define the encoded content from a tile of a video frame of the video frames.

3. The method of claim 2, further comprising:
performing a second encoding operation to write the encoded content to the content space.

4. The method of claim 2, further comprising:
defining a tile data header for the tile, the tile data header including the first space and the second space.

5. The method of claim 4, wherein a total number of bits allocated to the tile data header reflects a total number of bits necessary for encoding the encoded content to the bitstream.

6. The method of claim 1, wherein the first space is located within a frame-level data space and the second space is located within a tile-level data space, wherein the first space arranged in the bitstream prior to the second space.

7. An apparatus for encoding a video signal comprising video frames into a bitstream, the apparatus comprising:
a memory; and
a processor configured to execute instructions stored in the memory to:
write, in a first space of the bitstream, a first value indicating a number of bits available for a second space of the bitstream, the first value determined based on an estimated space requirement for encoding a portion of the video signal;
write, in a content space of the bitstream, encoded content associated with the portion of the video signal; and
write, in the second space, a second value indicating a number of bits used to write the encoded content in the content space, the second value determined subsequent to writing the encoded content in the content space.

8. The apparatus of claim 7, wherein the instructions to write the encoded content associated with the portion of the video signal include instructions to:
perform a first encoding operation to define the encoded content from a tile of a video frame of the video frames.

9. The apparatus of claim 8, wherein the instructions include instructions to:
perform a second encoding operation to write the encoded content to the content space.

10. The apparatus of claim 8, wherein the instructions include instructions to:
define a tile data header for the tile, the tile data header including the first space and the second space.

11. The apparatus of claim 10, wherein a total number of bits allocated to the tile data header reflects a total number of bits necessary for encoding the encoded content to the bitstream.

12. The apparatus of claim 7, wherein the first space is located within a frame-level data space and the second space is located within a tile-level data space, wherein the first space arranged in the bitstream prior to the second space.

13. A method, comprising:
decoding, using a processor, encoded video content from a bitstream including a first space, a second space, and a content space,
wherein a first value written in the first space indicates a number of bits available within the second space, and
wherein a second value written in the second space indicates a number of bits used to write the encoded video content in the content space.

14. The method of claim 13, wherein the encoded video content is associated with a tile and represents a portion of an encoded image, wherein the first value is determined based on an estimated space requirement associated with the encoded image.

15. The method of claim 14, wherein a portion of the bitstream to which the tile is encoded includes a tile data header, the tile data header including the first space, the second space, and the content space.

16. The method of claim 15, wherein decoding the encoded video content from the bitstream including the first space, the second space, and the content space comprises:
identifying the tile within the encoded image based on at least one of the first value or the second value written to the tile data header.

17. The method of claim 16, wherein identifying the tile within the encoded image based on the at least one of the first value or the second value written to the tile data header comprises:
locating the content space based on a location of the tile data header within the bitstream, wherein the encoded video content is written in the content space.

18. The method of claim 17, wherein locating the content space based on the location of the tile data header within the bitstream comprises:
reading the first value from the bitstream to determine a length of the tile data header; and
subsequent to reading the first value from the bitstream, reading the second value from the bitstream to determine a length of the content space.

19. The method of claim 14, wherein the decoding omits decoding portions of the encoded image not represented by the tile.

20. The method of claim 13, wherein the first space is located within a frame-level data space of the bitstream and the second space is located within a tile-level data space of the bitstream, wherein the first space is arranged in the bitstream prior to the second space.

* * * * *